Patented July 12, 1932

1,867,091

UNITED STATES PATENT OFFICE

WILHELM NEELMEIER AND WILHELM MEISER, OF LEVERKUSEN-ON-THE-RHINE, GERMANY, ASSIGNORS TO GENERAL ANILINE WORKS, INC., OF NEW YORK, N. Y., A CORPORATION OF DELAWARE

HYDROXY-1'.8'-NAPHTHOYLENE-NAPHTHIMIDAZOLES

No Drawing. Application filed July 19, 1929, Serial No. 379,573, and in Germany July 23, 1928.

The present invention relates to the new hydroxy-1'.8'-naphthoylene-naphthimidazoles and hydroxy-1'.8'-naphthoylene-naphthimidazole sulfonic acids, more particularly it relates to compounds of the probable general formula:

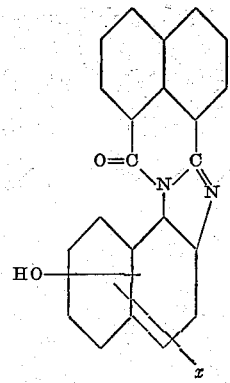

wherein $x$ stands for hydrogen or the sulfonic acid group and wherein the naphthalene nuclei may be further substituted by a hydroxy group.

Our new products are obtainable by melting with a caustic alkali a 1'.8'-naphthoylene-naphthimidazole sulfonic acid which may be represented by the general formula:

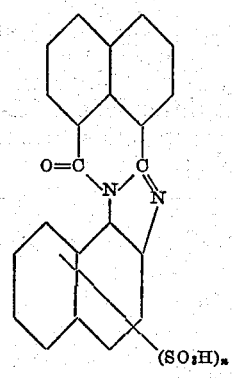

wherein $n$ stands for one of the numbers one and two and wherein the naphthalene nuclei may be further substituted.

These starting compounds are obtainable according to the process described by Bistrzycki and Risi, Helvetica chimica acta 1925, volume 8, page 818, by condensing in a suitable solvent a naphthalic acid anhydride or a derivative thereof with an 1.2-naphthylene-diamino sulfonic acid.

Our new process proceeds very smoothly, and after a short time, say about ½ hour, the reaction is complete. On neutralizing the alkali melt obtained according to our process with a mineral acid, the new compounds separate in the form of their alkali metal salts; the free naphthols are obtainable by the addition of a mineral acid. They are generally yellowish to orange colored substances of a high melting point, difficulty soluble in organic solvents if they are free from a sulfonic acid group, but not melting and insoluble in organic solvents if they contain a sulfonic acid group. The new compounds are valuable intermediate products in the manufacture of dyestuffs and pharmaceutical substances.

The following examples will illustrate our invention, without limiting it thereto; the parts are by weight:

*Example 1.*—The 1'.8'-naphthoylene-α-1.2-naphthimidazole-6-sulfonic acid, obtainable from 1.2-naphthylenediamine-5-sulfonic acid by condensation with naphthalic acid anhydride (nomenclature according to Richter, Lexikon der Kohlenstoffverbindungen, 3rd edition, page 21), is fused at 250° C. with 7 parts of caustic potash and some water. After neutralizing the bulk of the alkali with mineral acid the naphtholate separates. It is converted into the free naphthol by acids. The new compound having the formula:

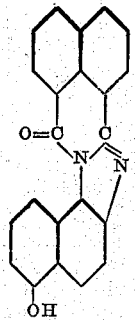

crystallizes from pyridine in the form of orange colored needles, melting at 323° C.; it is difficultly soluble in glacial acetic acid, rather difficultly soluble in dichlorobenzene and soluble in nitrobenzene.

In a similar manner the corresponding 8-hydroxy compound is produced by fusing with caustic alkali 1'.8'-naphthoylene-α-1.2-naphthimidazole-8-sulfonic acid (obtainable from 1.2-naphthylenediamine-7-sulfonic acid and naphthalic acid anhydride). It crystallizes from pyridine in the form of orange colored needles of the melting point 350° C., dissolves with difficulty in glacial acetic acid and is rather difficultly soluble in o-dichlorobenzene and nitrobenzene. It has the following structural formula:

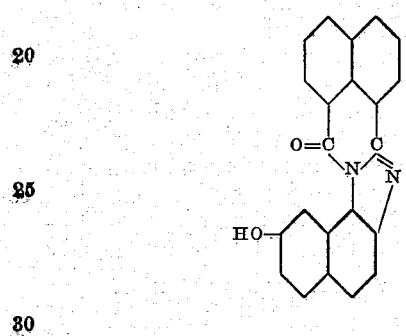

*Example 2.*—The 1'.8'-naphthoylene-α-1.2-naphthimidazole-6.8-disulfonic acid, obtainable from 1.2-naphthylenediamine-5.7-disulfonic acid by condensation with naphthalic acid anhydride, is fused with 6 parts of caustic potash and 2.5- parts of water at 180–190° C. From the diluted melt the orange colored, difficultly soluble 1'.8'-naphthoylene-α-1.2-naphthimidazole-6-hydroxy-8-sulfonic acid of the formula:

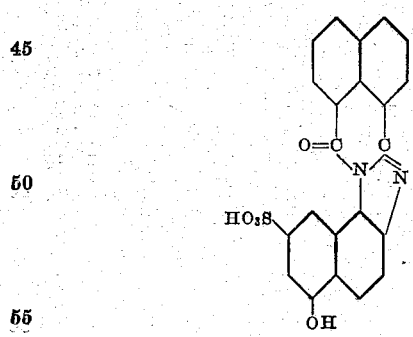

separates on acidification.

In an analogous manner the 1'.8-'-naphthoylene-α-1.2-naphthimidazole-7.9-disulfonic acid (obtainable from 1.2-naphthylenediamine-6.8-disulfonic acid and naphthalic acid anhydride) yields the orange colored, difficulty soluble 1'.8' - naphthoylene - α - 1.2- naphthimidazole-9-hydroxy-7-sulfonic acid. It has the following structural formula:

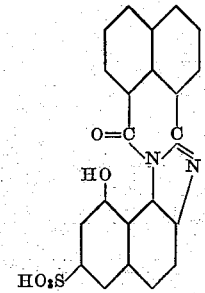

*Example 3.*—The 3'- or 6'-sulfonic acid-1'.8'-naphthoylene-α-1.2-naphthimidazole-6-sulfonic acid, obtainable by condensing naphthalic acid anhydride 3-sulfonic acid and 1.2-naphthylene-diamine-5-sulfonic acid, is fused at 250° C. with 7 parts of caustic soda. From the diluted melt there separates on acidifying with a mineral acid the 6-hydroxy-3'- or 6'-hydroxy-1'.8'-naphthoylene-α-1.2-naphthimidazole. From pyridine it is obtained in the form of orange colored needles which are not yet molten at 355° C. It corresponds to one of the following formulæ:

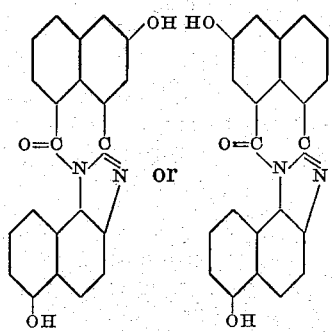

*Example 4.*—4'- or 5'-hydroxy-1'.8'-naphthoylene-α-1.2-naphthimidazole - 6 - sulfonic acid, obtainable by condensing 1.2-naphthylenediamine-5-sulfonic acid and 4-hydroxynaphthalic acid anhydride, is fused at 250° C. with 7 parts of caustic potash. From the diluted melt there separates on acidifying with mineral acid the 6-hydroxy-4'- or 5'-hydroxy-1'.8'-naphthoylene-α-1.2-naphthimidazole, which corresponds to one of the following formulæ:

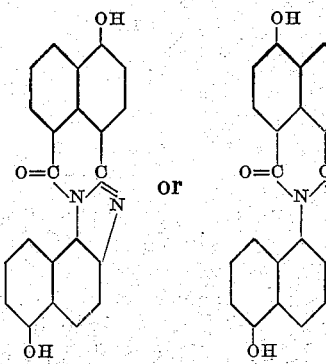

When recrystallized from pyridine it is obtained in the form of orange colored crystals which are not yet molten at 355° C.

We claim:

1. As new products, the compounds of the general formula:

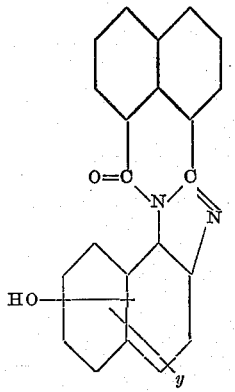

wherein y stands for hydrogen or the sulfonic acid group and wherein the naphthalene nuclei may be further substituted by a hydroxy group, said compounds being generally yellowish to orange colored substances, having a high melting point or melting not at all, difficultly soluble or insoluble in organic solvents and being valuable intermediate products in the manufacture of dyestuffs and pharmaceutical substances.

2. As new products, the compounds of the general formula:

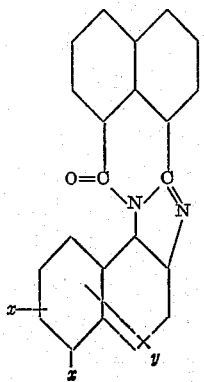

wherein one x stands for a hydroxy group, the other x stands for hydrogen, y stands for hydrogen or the sulfonic acid group, and wherein the naphthalene nuclei may be further substituted by a hydroxy group, said compounds being generally yellowish to orange colored substances, having a high melting point or melting not at all, difficultly soluble or insoluble in organic solvents and being valuable intermediate products in the manufacture of dyestuffs and pharmaceutical substances.

3. As a new product, the compound of the formula:

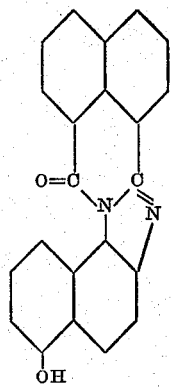

said compound being an orange colored substance melting at 323° C., difficultly soluble in organic solvents and being a valuable intermediate product in the manufacture of dyestuffs and pharmaceutical substances.

4. As a new product, the compound of the formula:

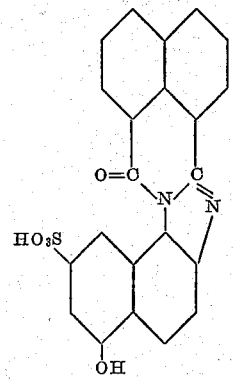

said compound being an orange colored substance, difficultly soluble in organic solvents and being a valuable intermediate product in the manufacture of dyestuffs and pharmaceutical substances.

5. As a new product, the compound of the formula:

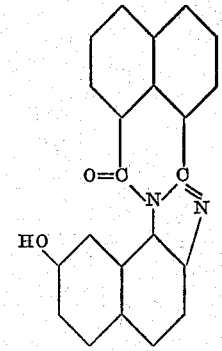

said compound crystallizing from pyridine in the form of orange colored needles, melting at 350° C., being difficultly soluble in organic solvents and being a valuable intermediate product in the manufacture of dyestuffs and pharmaceutical substances.

In testimony whereof we have hereunto set our hands.

WILHELM NEELMEIER. [L. S]
WILHELM MEISER. [L. S]